United States Patent
Saito

(10) Patent No.: US 7,046,291 B2
(45) Date of Patent: May 16, 2006

(54) IMAGE PHOTOGRAPHING SYSTEM HAVING TIMER FUNCTION, AND MEDIUM

(75) Inventor: Yutaka Saito, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 735 days.

(21) Appl. No.: 09/737,588

(22) Filed: Dec. 18, 2000

(65) Prior Publication Data

US 2001/0015757 A1 Aug. 23, 2001

(30) Foreign Application Priority Data

Feb. 21, 2000 (JP) .............................. 2000-043660

(51) Int. Cl.
*H04N 5/238* (2006.01)
*G03B 17/00* (2006.01)
*H04N 5/228* (2006.01)

(52) U.S. Cl. ............... 348/367; 396/264; 348/222.1

(58) Field of Classification Search ............... 396/264, 396/286; 348/220.1, 221.1, 362, 367
See application file for complete search history.

(56) References Cited

U.S. PATENT DOCUMENTS

| | | | | |
|---|---|---|---|---|
| 4,542,970 A | * | 9/1985 | Suzuki et al. ................. | 396/89 |
| 5,097,285 A | * | 3/1992 | Wakabayashi et al. ...... | 396/264 |
| 5,438,359 A | * | 8/1995 | Aoki ........................ | 348/231.9 |
| 5,923,908 A | * | 7/1999 | Schrock et al. ............... | 396/85 |
| 6,411,780 B1 | * | 6/2002 | Maruyama ................... | 396/59 |
| 6,853,403 B1 | * | 2/2005 | Inoue et al. ........... | 348/333.11 |

FOREIGN PATENT DOCUMENTS

| | | | |
|---|---|---|---|
| JP | SHO 61-174893 A | | 8/1986 |
| JP | A 06035032 A | | 2/1994 |

* cited by examiner

*Primary Examiner*—Ngoc-Yen Vu
*Assistant Examiner*—Kelly Jerabek
(74) *Attorney, Agent, or Firm*—Staas & Halsey LLP

(57) ABSTRACT

An image photographing system in which one button is used in common for a function of prompt photographing and a function of photographing after a predetermined time has elapsed, comprises a button for instructing an execution of an image photographing process, a control unit for monitoring a depression of this button, and a timer. The control unit starts up the timer by setting a first count time upon detecting the depression of the button, and starts up the timer by further setting a second count time when the first count time has elapsed before the depressed button is released, and the image photographing process is executed after the second count time has elapsed.

8 Claims, 3 Drawing Sheets

IMAGE PHOTOGRAPHING SYSTEM HAVING TIMER FUNCTION, AND MEDIUM

BACKGROUND OF THE INVENTION

The present invention relates to an image photographing system.

Timer photographing in an image photographing system such as a camera is defined as a function of performing photography after a predetermined time has elapsed after a user had started the timer photographing. For executing this function, a conventional image photographing system has a button for the timer photographing separately from a photographing button for instructing normal photographing.

If the photographing button and the timer photographing button are thus separately constructed, a larger area is needed for mounting these buttons. This kind of construction has been an obstacle against downsizing the image photographing system. Further, the timer photographing button is different from the normal photographing button, and therefore the number of components of the image photographing system increases.

SUMMARY OF THE INVENTION

It is a primary object of the present invention, which was devised to obviate the problems inherent in the prior art described above, to provide an image photographing system in which one button is used in common for a function of prompt photographing and a function of photographing after a predetermined time has elapsed.

It is another object of the present invention to provide an image photographing system capable of executing a timer photographing function and reducing the number of components with a simple construction.

To accomplish the above objects, according to one aspect of the present invention, a processing system comprises a timer, and a control unit for monitoring a button for instructing an execution of an image photographing process, starting up the timer if the button is depressed continuously for a predetermined time or longer, and executing the image photographing process after the timer has counted a predetermined time.

The processing system may be connected to an image photographing system, whereby the image photographing process is controlled. The connection may be provided with wireless method. Further, this processing system may be incorporated into the image photographing system, whereby the image photographing process is controlled.

The control unit, if a depressing time of the button is less than the predetermined time, may execute the image photographing process immediately after releasing the button from be depressed.

This button may be provided on a connectable/disconnectable image acquisition device. Further, the button may be an object displayed on a display device.

According to another aspect of the present invention, a processing system comprises a module for detecting a depressing time of a button for instructing an execution of an image photographing process, and a module for changing a timing of executing the image photographing process after releasing the button from being depressed on the basis of the depressing time of the button.

According to a further aspect of the present invention, an image photographing system comprises a button for instructing an execution of an image photographing process, a control unit for monitoring a depression of the button, and a timer. The control unit starts up the timer by setting a first count time upon detecting the depression of the button, and starts up the timer by further setting a second count time when the first count time has elapsed before the depressed button is released, and the image photographing process is executed after the second count time has elapsed.

This button may be a mechanical button and may also be a button, e.g., an icon displayed on a screen of a computer.

Herein, the timer is a device for measuring a specified count time and informing of an elapse thereof. The timer may be of either an increment type in which a time value is incremented from 0 up to the specified count time, or a decrement type in which the specified count time is decremented down to 0.

When the user depresses the button, the control unit starts up the timer by setting the first count time, and monitors whether or not the depressed button is released. In the case of executing the timer photographing, the user continues to depress the button. Thus, when the first count time elapses, the control unit starts up the timer by further setting the second count time. The second count time is a wait time for the timer photographing. Accordingly, the image photographing process is executed after the second count time has been elapsed.

On the other hand, the image photographing process may be executed immediately when the depressed button is released before the first count time elapses.

As explained above, according to the present invention, one button can be used in common for the normal photographing function of promptly conducting the photographing, and for the timer photographing function of performing the photographing after waiting till the predetermined time elapses. Further, with this construction, the number of components of the image photographing system can be decreased.

DETAILED DESCRIPTION OF THE PREFERRED EMBODIMENT

A preferred embodiment of the present invention will hereinafter be described with reference to the accompanying drawings.

A embodiment of the present invention will be discussed referring to FIGS. 1 through 4.

Figure 1:
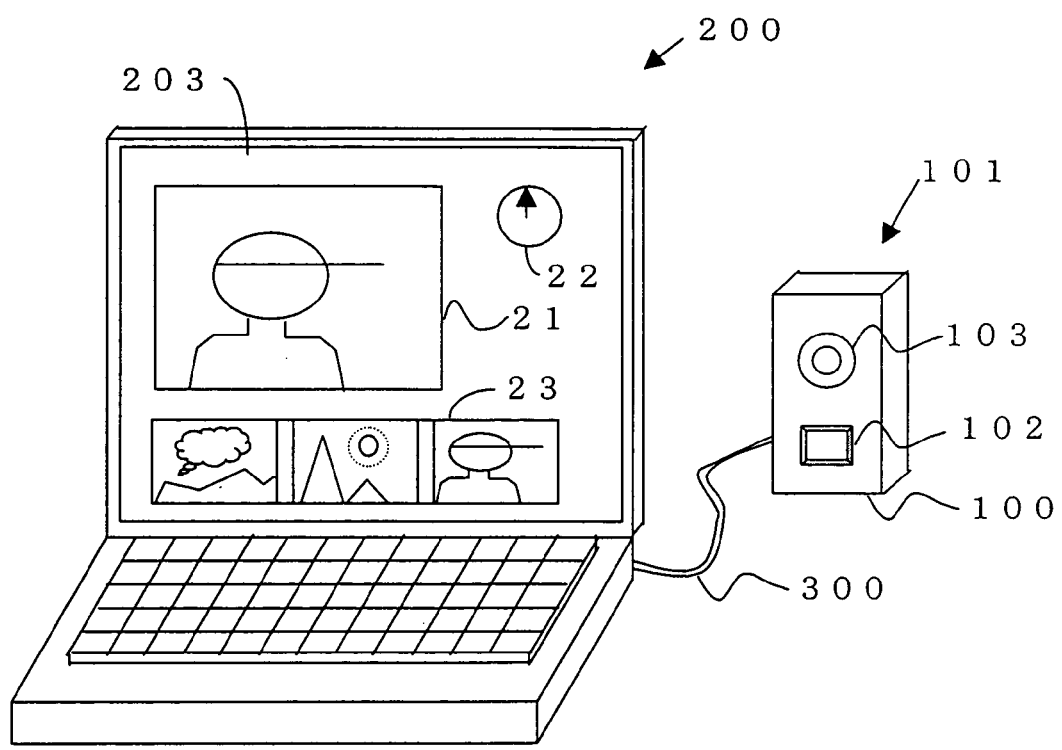
FIG. 1 is a view showing an external configuration of an image photographing system in an embodiment of the present invention.
Figure 2:
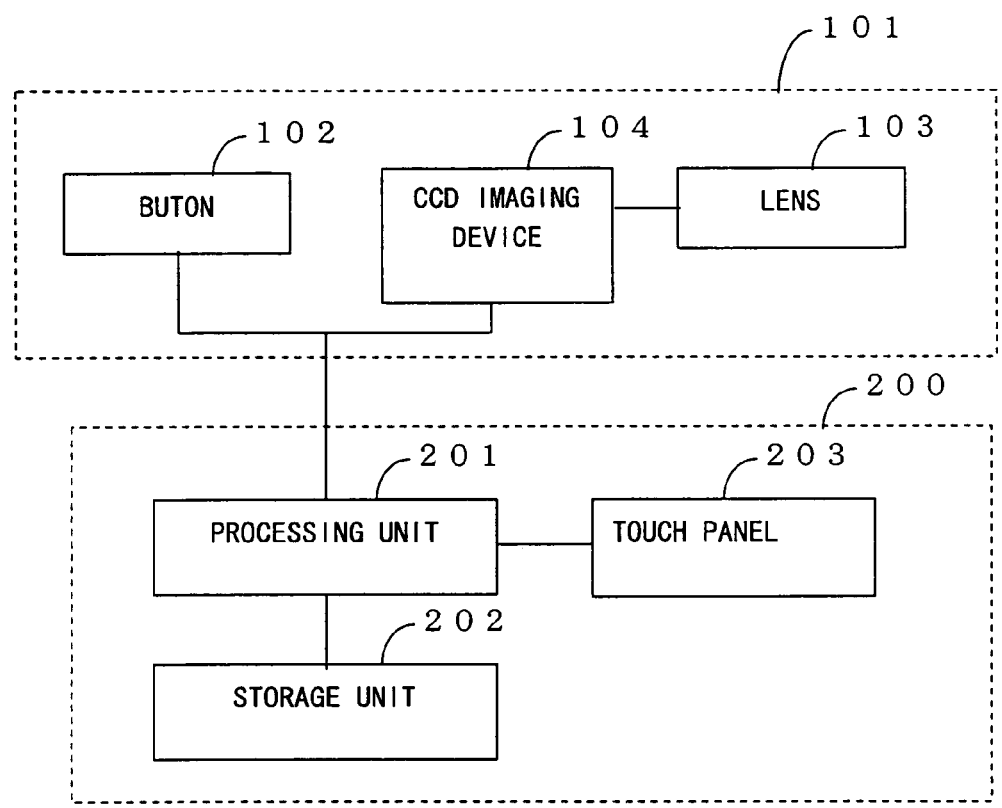
FIG. 2 is a block diagram showing a hardware architecture of the image photographing system in the embodiment of the present invention.
Figure 3:
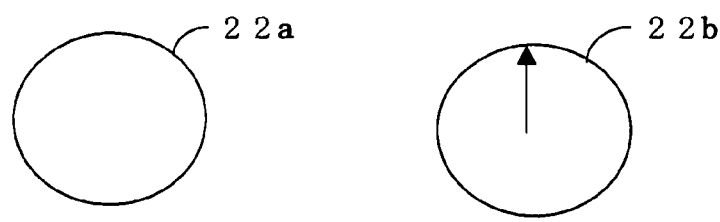
FIG. 3 is a view showing how a timer display icon changes.
Figure 4:
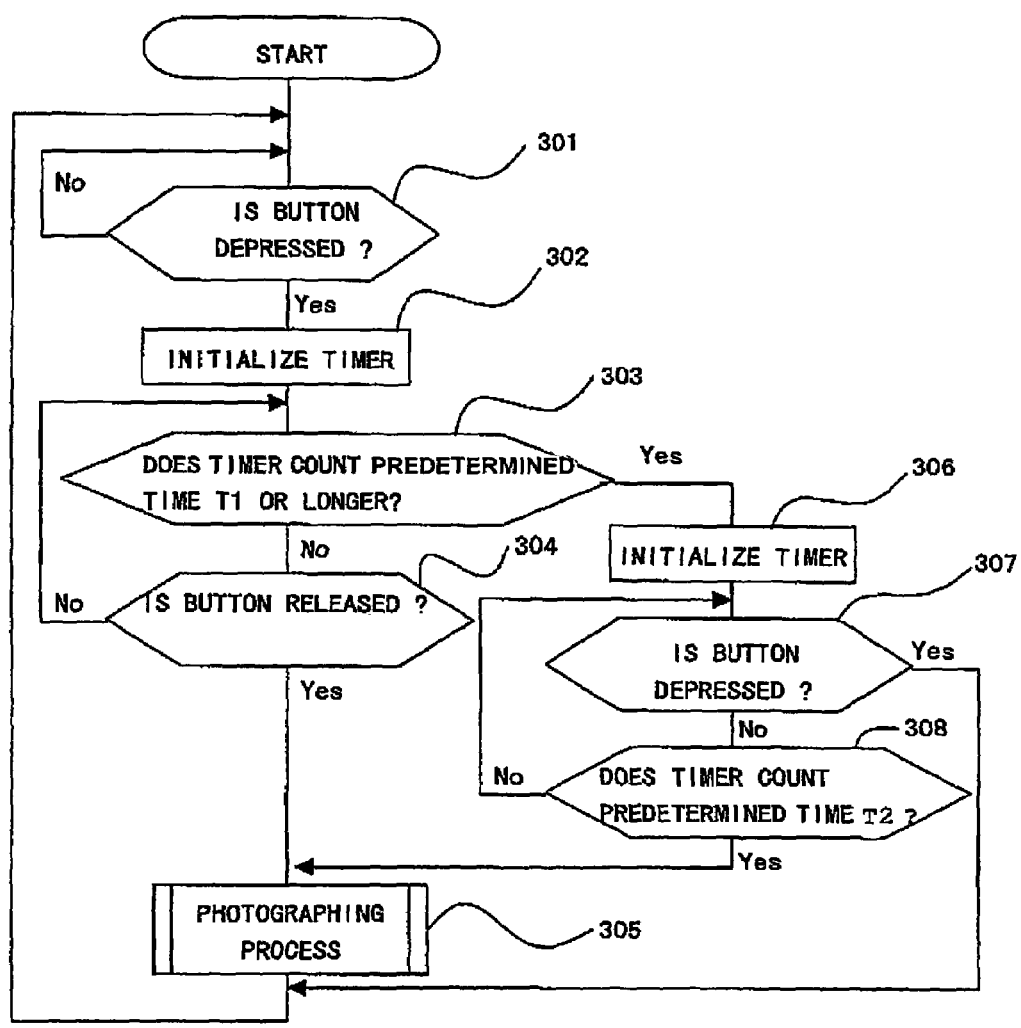
FIG. 4 is a flowchart showing processes of a control program.

FIG. 1 is a view showing an external configuration of an image photographing system in the first embodiment. FIG. 2 is a block diagram showing a hardware architecture of this image photographing system. FIG. 3 is a view showing a change in display configuration of a timer display icon 22 shown in FIG. 1. FIG. 4 is a flowchart showing processes of a control program executed by a processing unit 201.

<Architecture>

This image photographing system is, as shown in FIG. 1, constructed by connecting a portable terminal 200 to an image acquisition device 101 via a universal serial bus (which will hereinafter be abbreviated to USB) cable 300.

The portable terminal 220 includes a touch panel on which data are displayed, and detects a user's operation on this touch panel 203.

The touch panel 203 is constructed by combining a liquid crystal display with a sensor for detecting a position where the user depresses the touch panel 203. Data read from a CCD imaging device and icons etc for guiding the operations by the user, are displayed on the touch panel 203.

What is well known as the sensor of this type of touch panel 203 may be a pressure sensitive type sensor, an electrostatic type sensor and an ultrasonic type sensor.

The device for detecting the position of the operation by the user is not, however, limited to this touch panel in terms of actualizing the present invention, and, as a matter of course, other devices such as a mouse, a keyboard etc are usable.

The touch panel 203 has an image display screen 21, a timer display icon 22 and a photographed image display frame module 23.

Normally, the latest image photographed by the image acquisition device 101 is displayed on the image display screen 21. This image is read in real time from the image acquisition device 101 to the portable terminal 200.

Further, the images, which have already been photographed and stored on the hard disk, are to be displayed on the image display screen 21.

The photographed image is reduced and displayed as an index image in the photographed image display frame module 23. When the user selects a desired index image by an operation on the touch panel 203, the selected index image is enlarged and displayed on the image display screen 21.

The timer display icon 22 serves to indicate whether in the process of timer photographing or normal photographing. FIG. 3 shows variations in display configuration of this icon. The timer display icon 22 is a circular button 22a in the normal photographing state. When in the timer photographing, the timer display icon 22 changes to a button 22b with a hour hand when in the timer photographing, and is flickered. Further, the timer display icon 22 functions as a photography instruction button as a button 102 of the image acquisition device 101 functions.

FIG. 2 is a block diagram showing a hardware architecture of this image photographing system.

The image acquisition device 101 includes the button 102 for giving an instruction to execute the image photographing process and a lens 103, which are provided on a front surface of a body 100 thereof. The image acquisition device 101 has a CCD imaging device 104 incorporated into the body 100 thereof. The image acquisition device 101 is classified as a so-called CCD camera.

The lens 103 functions to form an image of a photographing object on the CCD imaging device 104 incorporated into the image acquisition device body 100. The image formed on the CCD imaging device 104 is transferred in real time to the portable terminal 200 via the USB cable 300.

The portable terminal 200 has inside a processing unit 201 for monitoring the button 102 and controlling the image acquisition device 101, a storage unit 202 for storing a control program executed by the processing unit 201 and data dealt with by the processing unit 201, and the touch panel 203 serving as a user interface.

The button 102 detects a user's depression on the button itself. Namely, when the button 102 is pressed down, an interruption occurs in the processing unit 201, and the button 102's being depressed is transferred to the processing unit 201.

The button also detects that the user releases the button 102. That is, when the button 102 is released from the depression, the interruption occurs in the processing unit 201, and the button 201's being released is transferred to the arithmetic unit 201.

The processing unit 201 executes the control program stored in the storage unit 202.

The processing unit 201 reads in real time data of the image formed on the CCD imaging device 104, and writes the image data to the storage unit 202. The image data written to the storage unit 202 are displayed on the image display screen 21 on the touch panel 203. Hence, the image momentarily changes on the image display screen 21.

Further, in a normal state, the processing unit 201 monitors the button 102 on the basis of an interruption processing function. To be specific, when the user depresses or releases the button 102, the processing unit 201 detects its operation in accordance with an unillustrated interruption processing program. If a depression time of the button 102 is less than a predetermined time T1 (corresponding to a first count time) the processing unit 201 executes a photographing process immediately after detecting the release of the button 102.

On the other hand, if the user continues to depress the button 102 over the predetermined time T1, the processing unit 201 sets a predetermined time T2 (corresponding to a second count time) and starts up a built-in timer. At this time, the processing unit 201 changes the timer display icon 22 to the button 23b with the hour hand. Further, the processing unit 201 flickers the button 23b with the hour hand and thus indicates that the timer has been started up. When the timer informs the processing unit 201 of an elapse of the predetermined time T2, the processing unit 201 executes the photographing process.

In the photographing process, the processing unit 201 stores the latest image data written in real time to the storage unit 202 in the unillustrated hard disk with a predetermined file name given to the same data. Further, the processing unit 201 creates an index image of this item of image data, and stores the storage unit 202 with the index image data together with the file name when the image data have been stored.

Note that this index image is displayed on the photographed image display frame module 23. When the user touches at the index image in a way of depressing it, the processing unit 201 detects the depression through the touch panel 203. Then, the processing unit 201 searches a file name corresponding to this index image, and displays the image data thereof on the image display screen 21.

The storage unit 202 is constructed of a RAM (Random Access Memory). The storage unit 202 is stored with the control program executed and with the image data processed by the processing unit 201.

FIG. 4 shows the processes of the control program executed by the processing unit 201. The processing unit 201 normally monitors whether or not the button 102 is depressed (step 301, which will hereinafter simply referred to as 301) on the basis of the interruption processing function.

Upon detecting the depression of the button 102, the timer is initialized by setting the time T1 in order to count a time for which the button 102 is depressed (302). Till the timer informs the processing unit 201 of an elapse of the time T1 (till a Yes judgement is made in 303), the processing unit 201 monitors the release of the button 102 based on the interruption processing function (304).

Before the timer notifies of the elapse of the time T1, the button 102 is released (Yes in 304), the processing unit 201 promptly executes the photographing process (305).

While on the other hand, if the notification of the elapse of the time T1 is given from the timer without releasing the button 102 (Yes in 303), the processing unit 201 boots again the timer by setting the time T2 (306). Further, the processing unit 201 flickers the timer display icon 22, thus indicating an on-execution of wait-for-time function by the timer.

In the meantime, the processing unit 201 monitors whether or not the button 102 is again depressed (307). Further, in parallel with this monitoring process, the processing unit 201 waits information from the timer (308).

When the button 102 is again depressed before being notified of the elapse of the time T2 from the timer, the processing unit 201 returns again to 301 and monitors the depression of the button 102 on the basis of the interruption processing function (Yes in 307). This is because the re-depression of the button 102 implies an instruction to cancel the timer photographing.

Whereas if notified of the elapse of the time T2 from the timer without re-depressing the button 102 (Yes in 308), the processing unit 201 executes the photographing process (305).

After finishing the photographing, the processing unit 201 goes again back to 301 and monitors the depression of the button 102 on the basis of the interruption processing function.

As discussed above, the image photographing system in this embodiment, if the button is released within the time T1 after the user has depressed the button 102, immediately executes the photographing, and, if the user continues to depress the button 102 over the time T1, carries out the timer photographing.

The image photographing system in this embodiment, if the button 102 is kept depressed for a long period of time, the timing of the photographing is delayed by the predetermined time. Further, the image photographing system in the present embodiment, if the button 102 is depressed for a short period of time, promptly performs the photographing. Thus, there exists an analogous relation between the delay time and the depressing time of the button 102, and hence the user is able to well familiarize with the operation of this image photographing system.

Downsizing is highly demanded of the portable terminal 200 described above and of the image acquisition device 101 connected to the personal computer etc. Accordingly, one single button 102 is used for the normal photographing and the timer, which is effective especially in the portable terminal 200 and the image acquisition device 101 connected to the portable terminal 200 that are required to be downsized.

<Modified Example of System>

The image photographing system in the embodiment discussed above is constructed by connecting the image acquisition device 101 to the portable terminal 200. The embodiment of the present invention is not, however, limited to this architecture. For example, the image photographing system may also be constructed by connecting the image acquisition device 101 to an unportable, i.e., so-called installation type computer substituting the portable terminal 200.

<Modified Example of Signal Medium>

In the embodiment discussed above, the image acquisition device 101 is connected via the USB cable 300 to the portable terminal 200. The embodiment of the present invention is not, however, confined to this architecture. A cable capable of transferring the data in parallel and an optical fiber cable may also be used in place of the USB cable 300.

Further, instead of their being connected via the cable, the image acquisition device 101 may have a light emitting unit, while the portable terminal 200 may have a light receiving unit, whereby the image is transferred through infrared-ray communications.

Moreover, the image acquisition device 101 may have a transmitter, while the portable terminal 200 may have a receiver, whereby the image is transferred on electromagnetic waves.

Furthermore, the present invention can be also embodied by such a configuration that the image acquisition device 101 is connected directly to the portable terminal 200 via an interface card.

<Modified Example by Push Button on Screen>

The normal photographing and the timer photographing are set depending on a length of the depressing time of the button 102 provided on the image acquisition device 101 in the embodiment discussed above. The embodiment of the present invention is not, however, restricted to this mode. For instance, the timer display icon 22 displayed on the touch panel 203 may also be used as a substitute for the button 102. That is, the normal photographing and the timer photographing may be executed in a distinguishable manner from each other depending on a length of a depressing time of the timer display icon 22 by detecting a depression of the timer display icon 22.

<Application to Digital Camera>

In the embodiment discussed above, the image photographing system is constructed by connecting the image acquisition device 101 to the portable terminal 200 via the USB cable 300. The embodiment of the present invention is not, however, limited to this construction. For example, in a typical digital camera, the normal photographing and the timer photographing may be executed in the distinguishable manner depending on a length of a depressing time of a photographing button thereof.

The image acquisition device 101 including the CCD imaging device 104 is used in the embodiment described above. The embodiment of the present invention is not, however, limited to this construction. For instance, a MOS image sensor may also be used in place of the CCD imaging device 104.

<Modified Example of Depressing Mode>

The normal photographing and the timer photographing are executed in the distinguishable manner depending on the length of the depressing time of the button 102 in the embodiment discussed above. Instead of this mode, the normal photographing and the timer photographing may be executed in the distinguishable manner depending on how many times the button 102 is depressed. In this case, a count time of the timer may be changed corresponding to the number of the depressions of the button 102. For instance, the following mode may be taken. An operation of depressing the button 102 once instructs the normal photographing, an operation of consecutively depressing the button 102 twice instructs the photographing after 10 seconds, and an operation of consecutively depressing the button 102 three times instructs the photographing after 15 seconds.

<Readable-by-Computer Recording Medium>

The control program in this embodiment may be recorded on a readable-by-computer recording medium. Then, the computer connected to the image acquisition device 101 is made to read and execute the control program on this recording medium, and is thereby capable of functioning as the image photographing system demonstrated in the present embodiment.

Herein, the readable-by-computer recording medium embraces recording mediums capable of storing information such as data, programs, etc. electrically, magnetically, optically and mechanically or by chemical action, which can be all read by the computer. What is demountable out of the computer among those recording mediums may be, e.g., a floppy disk, a magneto-optic disk, a CD-ROM, a CD-R/W, a DVD, a DAT, an 8 mm tape, a memory card, etc.

Further, a hard disk, a ROM (Read Only Memory) and so on are classified as fixed type recording mediums within the computer.

<Data Communication Signal Embodied in Carrier Wave>

Furthermore, the control program may be stored in the hard disk and the memory of the computer, and downloaded to other computers via communication media. In this case, the program is transmitted as data communication signals embodied in carrier waves via the communication media. Then, the computer downloaded with this program can be made to function as the image photographing system in this embodiment.

Herein, the communication media may be classified into cable communication mediums (such as metallic cables including a coaxial cable and a twisted pair cable, or an optical communication cable), and wireless communication media (such as satellite communications, ground wave wireless communications, etc).

Further, the carrier waves are electromagnetic waves for modulating the data communication signals, or the light. The carrier waves may be, however, DC signals (in this case, the data communication signal takes base band waveform with no carrier wave). Accordingly, the data communication signal embodied in the carrier wave may be any one of a modulated broad band signal and an unmodulated base band signal (corresponding to a case of setting a DC signal having a voltage of 0 as a carrier wave).

What is claimed is:

1. A processing system comprising:
   a timer; and
   a control unit monitoring a button for instructing an execution of taking a photograph of an image, detecting depression of the button, starting up said timer if said button is depressed continuously for a predetermined period of time or longer after detecting the depression of the button, and taking the photograph of the image after said timer has counted a second predetermined period of time,
   wherein said control unit, when a depressing time of said button is less than the first predetermined period of time, takes the photograph of the image immediately after releasing said button from being depressed.

2. A processing system according to claim 1, wherein said button is provided on a connectable/disconnectable image acquisition device.

3. A processing system according to claim 1, wherein said button is an object displayed on a display device.

4. A processing system comprising:
   a module detecting a depressing time of a button instructing the taking of a photograph of an image; and
   a module changing an interval from a timing of releasing said button to a timing of taking the photograph of the image after releasing said button from being depressed according to a length of the depressing time of said button, wherein when the length of the depressing time is less than a first predetermined time period, the photograph of the image is taken immediately after releasing said button from being depressed, and when the length of the depressing time is continuous for the first predetermined time period or longer, the photograph of the image is taken after a second predetermined time period has elapsed.

5. An image photographing system comprising:
   a button instructing an execution of taking a photograph of an image;
   a control unit monitoring a depression of said button; and
   a timer,
   wherein said control unit starts up said timer by setting a first count time upon detecting the depression of said button, and starts up said timer by further setting a second count time when the first count time has elapsed before the depressed button is released, and
   taking the photograph of the image after the second count time has elapsed, and taking the photograph of the image immediately, when said depressed button is released before the first count time elapses.

6. A storage medium readable by a machine tangible embodying a program of instructions executable by the machine to perform method steps comprising:
   detecting a depression of a button for instructing to take a photograph of an image;
   starting up a timer by setting a first count time after detecting the depression of said button;
   detecting a release of said button;
   starting up said timer by further setting a second count time when the first count time elapses before said depressed button is released;
   taking the photograph of the image after the second count time has elapsed and
   taking the photograph of the image immediately, when said depressed button is released before the first count time elapses.

7. A storage medium readable by a machine tangible embodying a program of instructions executable by the machine to perform method steps comprising:
   displaying, on a display device, a button of which a depression is detectable;
   detecting a depression of said button;
   starting up a timer by setting a first count time after detecting the depression of said button;
   detecting a release of said button;
   starting up said timer by further setting a second count time when the first count time elapses before said depressed button is released; and
   taking a photograph of an image after the second count time has elapsed; and
   taking the photograph of the image immediately, when said depressed button is released before the first count time elapses.

8. An apparatus comprising:
   a timer to count first and second predetermined time periods; and
   a control unit monitoring a button for capturing a image photograph, the control unit detecting depression of the button, starting up the timer when the button is depressed continuously for the first predetermined time period or longer after detecting the depression of the button, and capturing the image photograph after the timer has counted the second predetermined time period, and when a depressing time of the button is less than the first predetermined time period, capturing the image photograph immediately, after releasing said button from being depressed.

* * * * *